E. TYLER.
Fruit-Gatherer.
No. 50,859 — Patented Nov. 7, 1865.
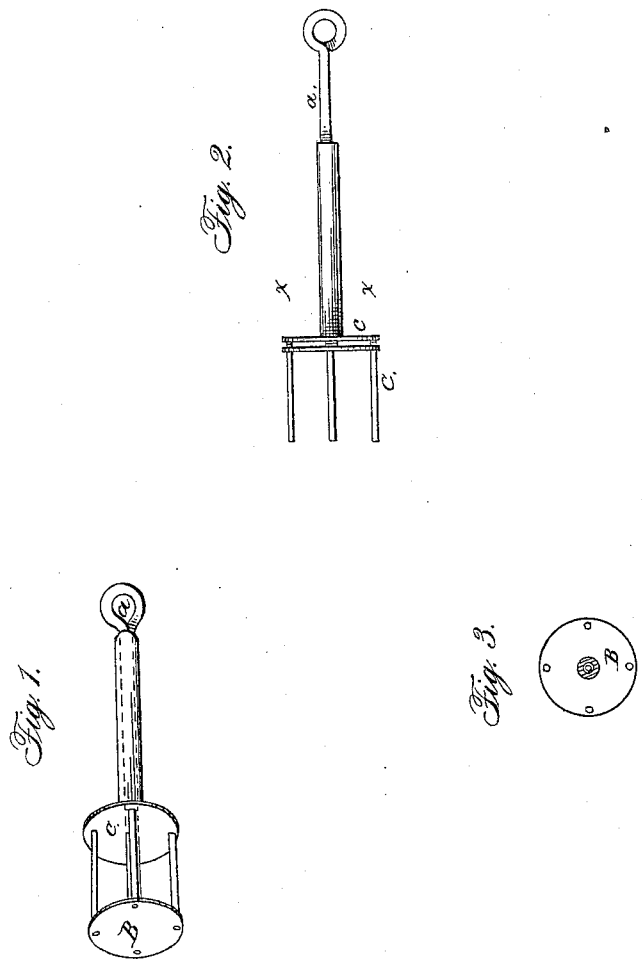
Witnesses:
Geo. Peaks
Wm. E. Graw
Inventor:
Erastus Tyler
by
L. Brown & Co.
Attorneys.

UNITED STATES PATENT OFFICE.

ERASTUS TYLER, OF HANCOCK, ILLINOIS.

INSTRUMENT FOR GATHERING APPLES.

Specification forming part of Letters Patent No. 50,859, dated November 7, 1865.

*To all whom it may concern:*

Be it known that I, ERASTUS TYLER, of the town of Hancock, in the county of Hancock and State of Illinois, have invented a new and useful Machine for Gathering Apples from the Ground or from the Trees; and I do hereby declare that the following is a full, clear, and exact description of the construction and operation of my said invention, reference being had to the annexed drawings, making a part of this specification, and to the letters of reference marked thereon.

The object of my invention is to provide means for picking apples from the ground without stooping to gather them by hand; also, to take the apples from the trees without danger of bruising by a fall on the ground.

To this end I construct a rod of suitable length and strength, usually of iron and about one-half inch in diameter, and at one end thereof I attach a circular plate perforated with four or more holes, corresponding in size to the pins hereinafter described. This rod is marked A on the drawings, and the said perforated plate is marked B. I also construct a tubular slide that is moved back and forth upon said rod, to the lower end of which I attach a circular plate (marked C) that corresponds in size to the plate B. In this plate C I fasten four or more sharp-pointed pins, that project from the lower side thereof and work freely through the openings in the plate B above mentioned, and may be moved back and forth in the same at will.

The mode of operating my said invention is as follows, namely: Hold the rod A in the right hand, and with the left hand crowd down the tubular slide C till the pins in said slide enter the apple. Then lift the apple over the basket and move the slide upward. The apple falls in the basket, and the work is done. I may increase the number of said pins and the size of the plates to any desirable extent, so as to pick up several apples at a time; and I may reverse the method of adjustment above described, so as to place the pins upon the rod-plate and the openings therefor in the slide-plate.

For gathering apples from a tree a long rod is required, and the slide must correspond therewith in length.

I am aware that punctures made in apples or other fruit hastens the decay of the same, and therefore I only use my device for gathering fruit intended for immediate use. Apples and other fruit intended for the table while yet fresh, cider-apples, and all fruit designed for preservation by drying, or for cooking, may be gathered by my device without injury thereto.

What I claim as my invention, and desire to secure by Letters Patent, is—

An instrument for picking apples, having a perforated plate, B, or its equivalent, a slide, as described, and plate and pins C, or their equivalents, combined and arranged substantially as described.

ERASTUS TYLER.

Witnesses:
GEO. F. PEAKS,
R. LEECH.